(12) United States Patent
    Clauson

(10) Patent No.: US 8,376,885 B2
(45) Date of Patent: ***Feb. 19, 2013

(54) METHODS AND DEVICES FOR ALTERING THE TRANSMISSION RATIO OF A DRIVE SYSTEM

(76) Inventor: Luke W. Clauson, Atherton, CA (US)

( * ) Notice: Subject to any disclaimer, the term of this patent is extended or adjusted under 35 U.S.C. 154(b) by 1128 days.

This patent is subject to a terminal disclaimer.

(21) Appl. No.: 10/570,479

(22) PCT Filed: Jul. 12, 2004

(86) PCT No.: PCT/US2004/022569
§ 371 (c)(1),
(2), (4) Date: May 27, 2008

(87) PCT Pub. No.: WO2005/007439
PCT Pub. Date: Jan. 27, 2005

(65) Prior Publication Data
US 2008/0223640 A1    Sep. 18, 2008

Related U.S. Application Data

(63) Continuation-in-part of application No. 10/619,751, filed on Jul. 14, 2003, now Pat. No. 7,101,307.

(51) Int. Cl.
*H02P 17/00*    (2006.01)
*F16H 3/72*    (2006.01)
*F16H 37/06*    (2006.01)
*B60K 6/445*    (2007.10)
*B60K 17/00*    (2006.01)
*B60W 10/04*    (2006.01)
*B60W 20/00*    (2006.01)

(52) U.S. Cl. .............. 475/5; 475/4; 475/10; 477/15; 180/65.235; 180/65.285; 180/65.7

(58) Field of Classification Search ............... 475/1–10; 180/65.235, 65.28, 65.285, 65.7; 477/15
See application file for complete search history.

(56) References Cited

U.S. PATENT DOCUMENTS

| | | | |
|---|---|---|---|
| 1,870,076 A | 8/1932 | Thomson | |
| 3,592,077 A * | 7/1971 | Polak | 475/80 |
| 3,982,448 A * | 9/1976 | Polak et al. | 475/80 |
| 4,165,795 A | 8/1979 | Lynch et al. | |
| 4,259,881 A * | 4/1981 | Meyerle | 475/72 |
| 4,896,563 A * | 1/1990 | Manor et al. | 475/80 |
| 5,285,111 A * | 2/1994 | Sherman | 290/4 C |
| 5,343,970 A * | 9/1994 | Severinsky | 180/65.25 |
| 5,433,282 A * | 7/1995 | Moroto et al. | 180/65.21 |
| 5,771,478 A * | 6/1998 | Tsukamoto et al. | 701/68 |
| 5,935,035 A | 8/1999 | Schimdt | |
| 5,980,410 A | 11/1999 | Stemler et al. | |
| 5,997,426 A * | 12/1999 | Ito et al. | 475/80 |
| 6,018,198 A | 1/2000 | Tsuzuki et al. | |
| 6,054,776 A * | 4/2000 | Sumi | 290/17 |
| 6,110,066 A | 8/2000 | Nedungadi et al. | |
| 6,455,947 B1 | 9/2002 | Lilley et al. | |
| 6,527,658 B2 * | 3/2003 | Holmes et al. | 475/5 |
| 6,540,631 B2 * | 4/2003 | Holmes | 475/5 |
| 6,558,283 B1 | 5/2003 | Schnelle | |

(Continued)

*Primary Examiner* — Tisha Lewis
(74) *Attorney, Agent, or Firm* — Jens E. Hoekendijk

(57) ABSTRACT

The transmission ratio between a first motor and an output shaft is varied by changing the speed of a second motor. The first and second motors are coupled to the output shaft with a planetary gear set. The first and second motors may both add power to the drive system.

28 Claims, 9 Drawing Sheets

U.S. PATENT DOCUMENTS

| | | |
|---|---|---|
| 6,732,526 B2 | 5/2004 | Minagawa et al. |
| 6,751,960 B2 * | 6/2004 | Arimitsu et al. ................. 60/706 |
| 6,863,633 B2 * | 3/2005 | Misu ................................ 475/5 |
| 6,877,575 B2 * | 4/2005 | McCarthy ................ 180/65.235 |
| 7,000,717 B2 * | 2/2006 | Ai et al. .................... 180/65.235 |
| 7,101,307 B2 * | 9/2006 | Clauson ............................ 477/2 |
| 2003/0078134 A1 | 4/2003 | Kojima et al. |
| 2004/0043856 A1 | 3/2004 | Xiaolan |

* cited by examiner

METHODS AND DEVICES FOR ALTERING THE TRANSMISSION RATIO OF A DRIVE SYSTEM

CROSS-REFERENCE TO RELATED APPLICATIONS

The present application claims priority from PCT Application No. PCT/US04/22569, filed Jul. 12, 2004 and is also a continuation-in-part of application Ser. No. 10/619,751, filed Jul. 14, 2003, now U.S. Pat. No. 7,101,307 the full disclosures of which are incorporated herein by reference for all purposes.

BACKGROUND

The present invention is directed to devices and methods of adjusting the transmission ratio (speed ratio) between a motor output and a transmission output shaft. Various methods of varying the transmission ratio have been described in the past. Many prior art systems use pulleys and/or belts to provide a continuously variable transmission. These systems have inherent mechanical inefficiencies as well as parts, such as belts, which tend to wear and may require one or more replacements during the life of the system.

The present invention is also directed to methods and systems for combining the power of two or more motors. The combination of power may be used to perform any type of work. The present invention may be used in systems which typically have only one motor and, of course, has obvious applications for systems having two motors such as so-called hybrid vehicles. The present invention is particularly advantageous when combining the power of a heat engine, such as an internal combustion engine, with the power of an electrical motor.

The present invention is also directed to methods of controlling the operation of two motors. In particular, the present invention is directed to increased efficiency and/or increased performance.

SUMMARY

The present invention provides methods and devices for varying the transmission ratio between a first motor and an output shaft. A drive system is provided which has a first motor, a second motor, an output shaft and a control system which controls operation of the first and second motors. In one aspect of the present invention, a planetary gear set is provided which has a ring gear, a sun gear and a carrier which supports at least one planet gear. The first and second motors and the output shaft are each coupled to one of the ring gear, sun gear and carrier.

The transmission ratio between the first motor and the output shaft may be varied by varying the speed of the second motor. The output shaft speed may increase as the speed of the second motor increases while the speed of the first motor is held constant. The control system may select the transmission ratio dependent upon operator input, a desired output torque, power and/or load demand on the output shaft.

In another aspect of the present invention, the first motor is operated in a desired performance range by varying the speed of the second motor thereby varying the transmission ratio between the first motor and the output shaft. For example, the first motor may be operated within a speed range 2000 rpm, or even less than 1000 rpm, while the power output increases at least 50% of a peak power output. In a further aspect, the first and second motors both add power to the output shaft and provide the ability to combine power of the first and second motors when the output shaft is initially not rotating. In yet another aspect, the first and second motors may have a continuous or intermittent power ratings within 20% of one another and even within 10% of one another.

In still another aspect of the present invention, a method of combining the power from the first and second motors is provided. The speed of the second motor is used to change the transmission ratio between the first motor and the output shaft. The first motor is operated in a desired performance range by varying the transmission ratio between the output shaft and the first motor by varying the speed of the second motor. The transmission ratio may be varied in response to a torque or power demand on the output shaft and may be varied in a stepless manner.

In yet another aspect of the present invention, a method of adjusting the transmission ratio of a primary motor is provided. The primary motor is coupled to an output shaft to provide power at the output shaft. The second motor speed is varied to adjust the transmission ratio between the first motor and the output shaft. The second motor speed increases in speed causing the output shaft speed to increase while the primary motor speed is held constant.

In another aspect of the invention, the system may also include two sun gears. The sun gears may engage the same ring gear which has a second set of planet gears which in turn is coupled to the second motor or to the output shaft. Each sun gear my be selectively coupled and decoupled to its shaft to provide various paths for power transmission. Use of two or more sun gears provides additional modes of operation over use of a single sun gear and, in particular, provides additional fixed gear modes.

In yet another aspect of the invention, the system may have two planet gears or two sets of planet gears in series. The first planet gear(s) engage the sun gear and the second planet gear(s) engage the first planet gear and the ring gear. The first and second motors and the output shaft are each coupled to one of the ring gear, sun gear and carrier.

In still another aspect of the invention, the first power source input shaft may be selectively coupled to the second power source input shaft and the second power source. This combination allowing for additional fixed gear modes as well as secondary power source function within the system. For example, the first motor may be coupled to one or more selectable sun gears while the output shaft may be coupled to the ring gear and the second motor is coupled to the carrier and the sun via a fixed speed ratio that can be selectively engaged or disengaged. Alternately, the first motor may be coupled to one or more selectable sun gears while the output shaft may be coupled to the carrier and the second motor is coupled to the ring gear and the sun via a fixed speed ratio that can be selectively engaged or disengaged.

DESCRIPTION OF THE PREFERRED EMBODIMENTS

Figure 1:
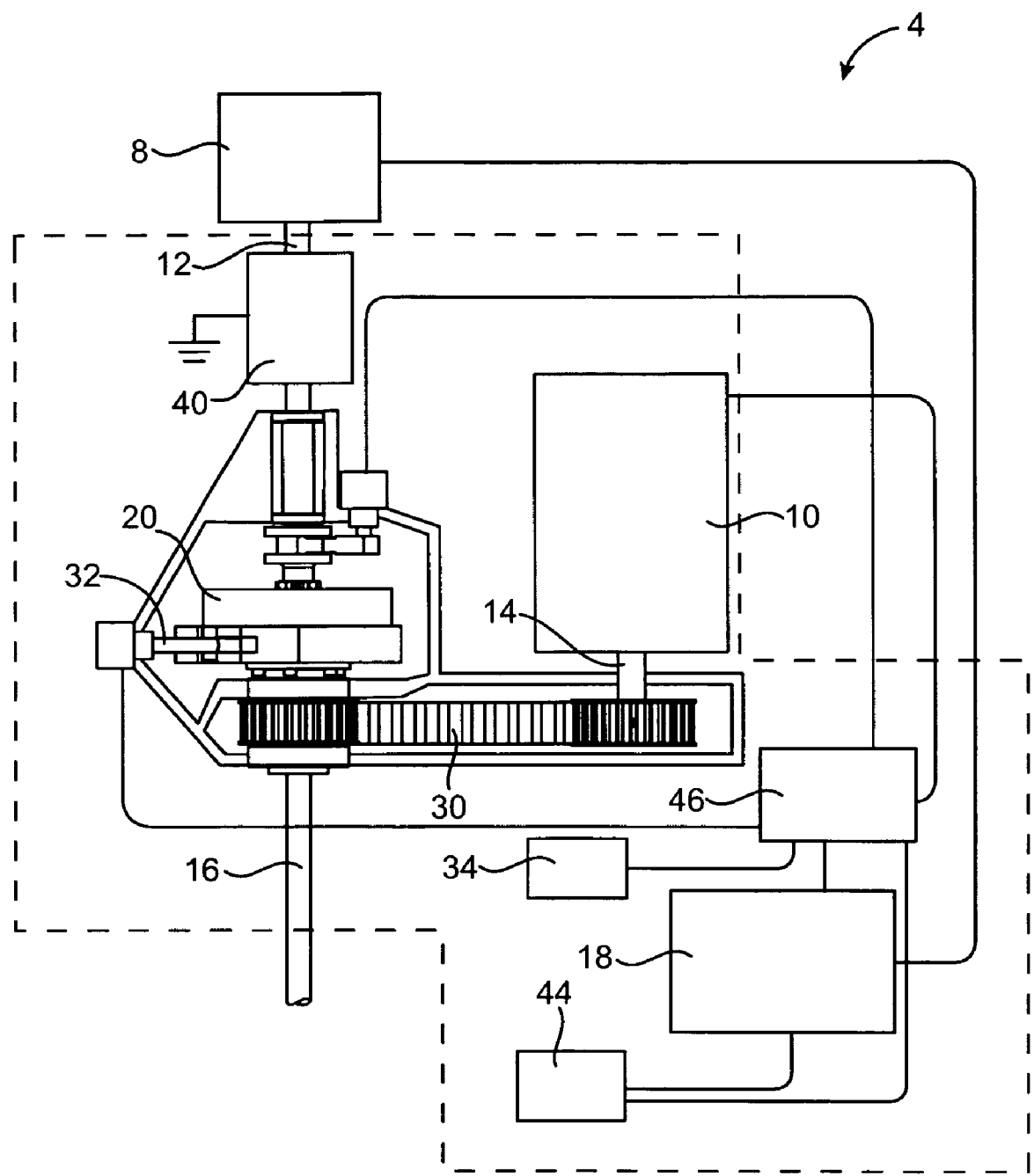
FIG. 1 shows a drive system according to the present invention.

Referring to FIG. 1, a system 2 according to the present invention is shown. The system 2 may be embodied in an engine or a drive system 4 to perform any suitable work or function. For example, the system 2 may be used in a hybrid vehicle although the present invention may be used for any other suitable purpose including applications typically having only one motor. The present invention may be particularly useful in systems with a high inertial load and/or highly variable power requirements. The present invention may also be particularly useful in enhancing the efficiency or power performance of a motor by operating the motor at efficient or otherwise desirable regions within the operating parameters such as peak power output and/or peak efficiency.

The system 2 includes a first motor 8 and a second motor 10. The first and second motors 8, 10 produce rotary output at a first motor output shaft 12 and a second motor output shaft 14. An output shaft 16 is driven by one or both motors 8, 10 as described herein to perform any suitable work. The output shaft 16 may be coupled to a clutch, brake, power transferring elements or other suitable elements within a power transmission system.

A control system 18 is coupled to the first and second motors 8, 10 to control the operation of the motors 8, 10 as described below. As mentioned above, the rotary output may be used to perform any type of work and an example of which is moving a vehicle. Of course, the present invention is useful in many other fields. In particular, the present invention is useful for providing useful work when power requirements vary considerably during operation such as locomotive engines, tractors and cranes to name a few.

Figure 2:
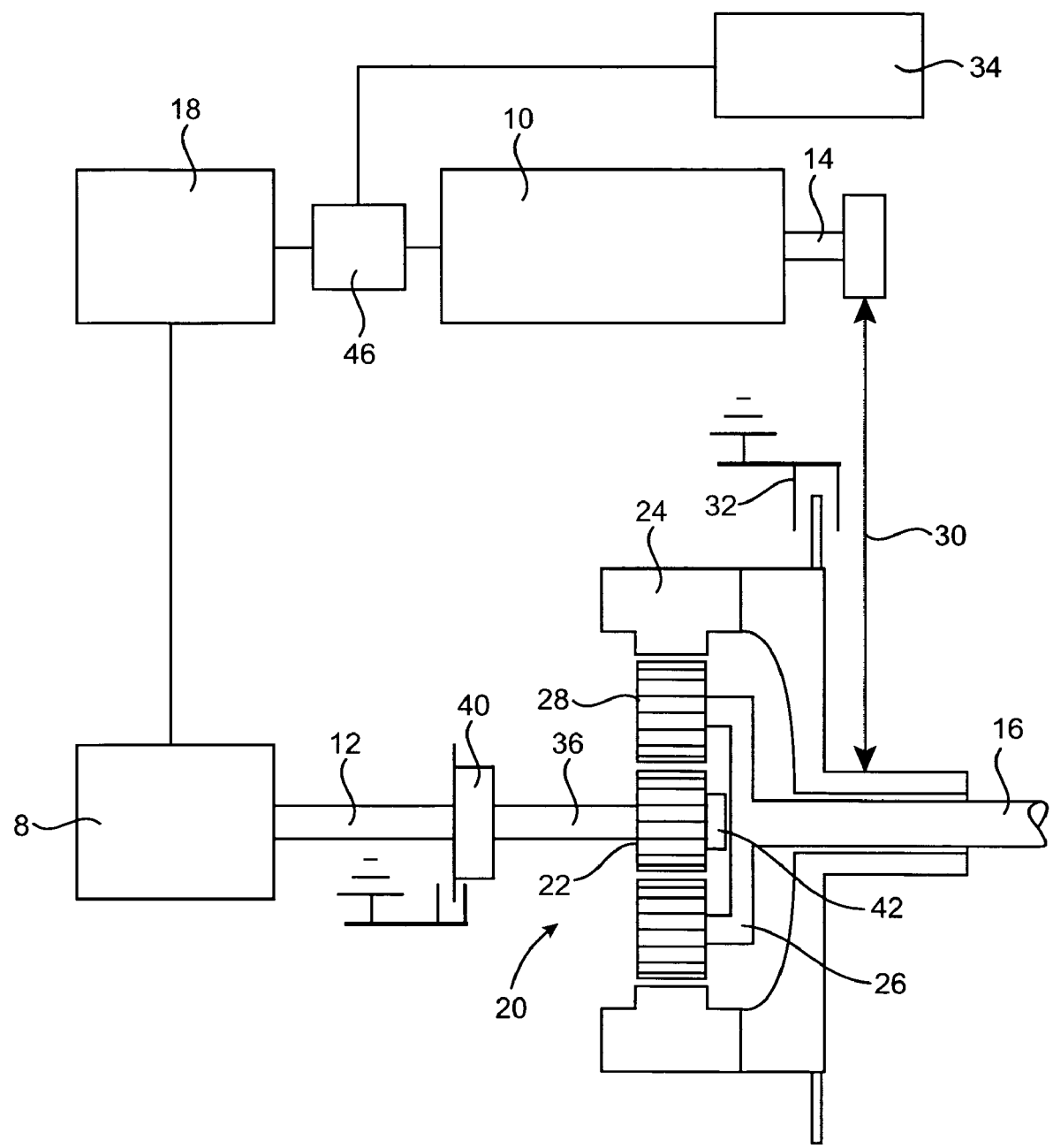
FIG. 2 shows a simplified block diagram showing first and second motors coupled together to produce rotary output at an output shaft.

Referring now to FIG. 2, the first and second motors 8, 10 are coupled together via a planetary gear set 20. The first motor 8 is coupled to a sun gear 22, the second motor 10 is coupled to a ring gear 24, and the output shaft 16 is coupled to a carrier 26 which supports one or more planetary gears 28. The ring gear 24 is in direct communication with the planet gear(s) 28 carried by the carrier 26 and the planet gear 28 is in direct communication with the sun gear 22. The second motor 10 is coupled to the ring gear 24 with a suitable power transmission element 30 such as mating gears, pulleys, a belt or chain. The second motor 10 may also be directly coupled to the shaft of the ring gear 24 by locating it concentric to the ring gear 24.

The direct physical connection and engagement between the sun gear 22, ring gear 24 and carrier 26 provides obvious advantages over systems which require displacement of belts, pulleys, chains or cones which tend to wear and can be relatively expensive. Furthermore, the power transmitting capacity of such systems may not be sufficient for some applications. The direct physical connection between the sun gear 22, ring gear 24 and carrier 26 provides a robust power transmission system as compared to systems which displace or distort or otherwise reposition belts, pulleys, chains or semispherical gears. The spacing or orientation between the shafts also does not change when changing the transmission ratio providing advantages over systems requiring a change in shaft spacing or position. Finally, the gear set of the present invention does not require a change in effective diameter acting on any of the shafts as is the case with some pulley, chain or belt systems which displace or distort the pulley, chain or belt to change the effective diameter acting on one or more shafts. Although the present invention may use belts, pulleys, chains and the like, the present invention does not require a change in the position or orientation of these elements to change the transmission ratio. These elements, if used, would merely be used for power transmission such as from the second motor 10 to the planetary gear set 20 as mentioned above.

The ring gear 24 has a brake 32 which may be used to stop the ring gear 24. The brake 32 mechanically stops and isolates the second motor 10 so that the second motor 10 does not convert energy nor require consumption of energy to stop rotation and hold the gear as in some other systems. Engaging the brake 32 creates a low, discrete speed ratio between the first motor 8 and the output shaft 16. If the second motor 10 is an electric motor, it is an inefficient use of power to slow or keep a shaft from rotation by using it as a brake. Using an electric motor in this manner consumes power but does little or no work. Power conversion for the purpose of electrical braking to attain a specific transmission ratio decreases efficiency by requiring energy without performing work or through energy conversion losses.

Of course, the present invention may be used to operate the second motor 10 as a generator to produce electrical energy to charge a power storage device 34 such as a battery or capacitor, however, such conversions are done only as needed to maintain the power in the power storage device 34 and as directed by the control system 18. Power stored during such cycles would be used for the sake of increased system performance or when it is more efficient to use the stored power than to directly produce power with the first motor 8. The present invention may provide efficient methods of operating the engine or system which may require conversion of rotational energy into electrical energy which is stored by the power storage device 34. The first input shaft 36 may include a clutch/brake assembly 40 to stall its rotation and decouple it from the first motor 8 thereby permitting use of only the second motor 10 to drive the system. The system 2 may also include sensors to transmission control and inverter/drive unit 46.

A synchronizer 42 is provided to directly couple rotation of the first motor output shaft 12 (via the first input shaft 36) to the transmission output shaft 16. The synchronizer 42 may be engaged as necessary and controlled by the control system 18. Engagement of the synchronizer 42 couples the first and second motors 8, 10 together in series to the transmission output shaft 16. In this mode, both motors may add power to the output shaft 16 or the second motor 10 may be intermittently or continuously used as a generator when the second motor 10 is an electric motor/generator. This mode of operation may be used when the speed requirements of the output shaft 16 are relatively narrow or are not changing quickly, such as cruising in a vehicle, or when it is inefficient or impractical to continue to power the second motor 8. The brake 32 may also be applied to isolate the second motor 10 as explained above so that only the first motor 8 drives the output shaft 16. The synchronizer 42 may be any suitable device or structure. For example, the synchronizer 42 may work by sliding the sun gear 22 forward and backward on a splined first input shaft 36. The carrier 26 has a recess 43 into which the sun gear 22 enters and locks when the synchronizer 42 is engaged. When the synchronizer 42 is engaged, the second motor 10 may add no power to the drive system 4, used as a generator to generate electrical energy for storage, or may be used to combine power with the first motor 8 in series as needed. In this context, the term series refers to a mechanical connection between two interacting components.

Figure 3:
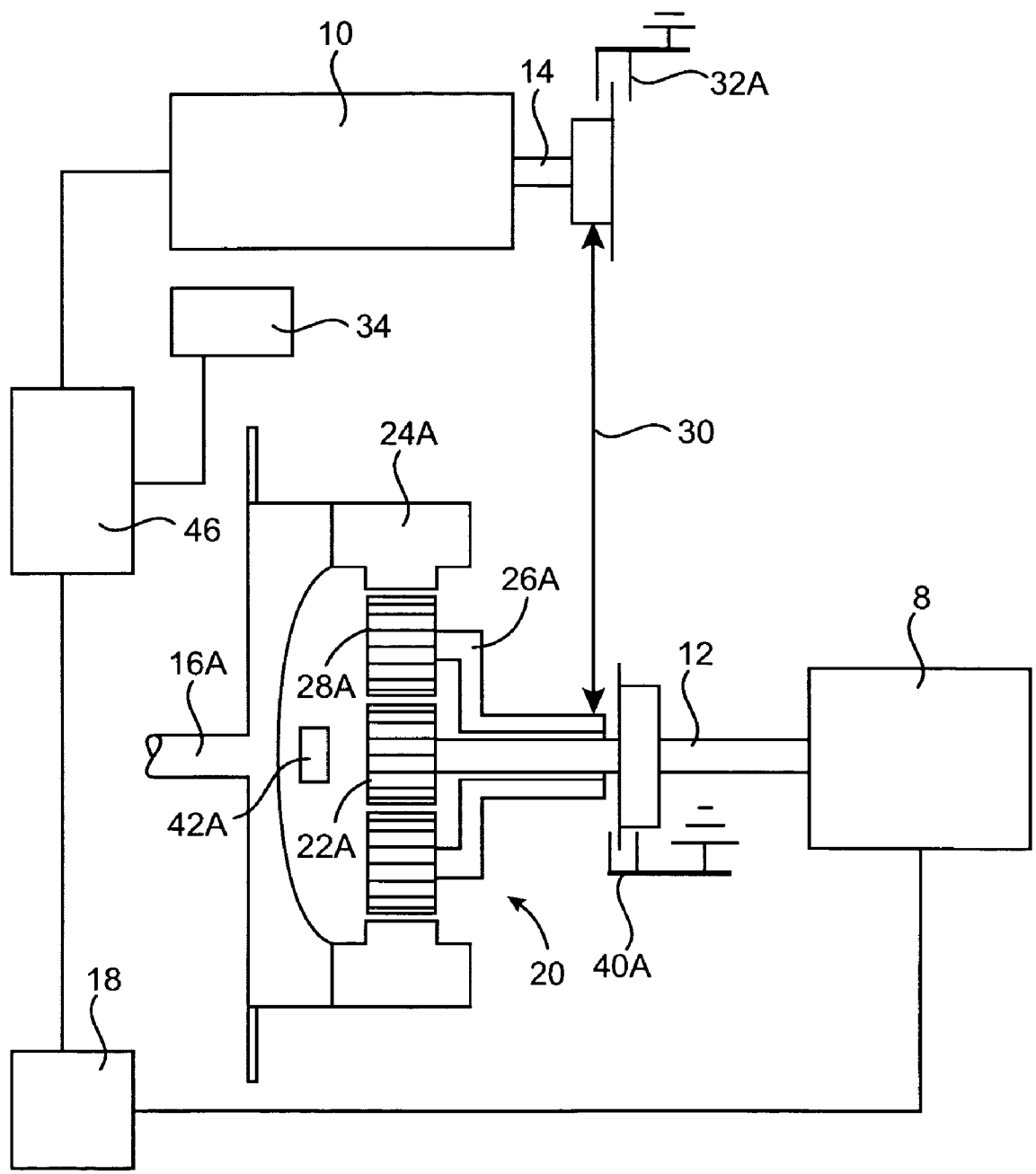
FIG. 3 shows a simplified block diagram of another configuration according to the present invention.
Figure 4:
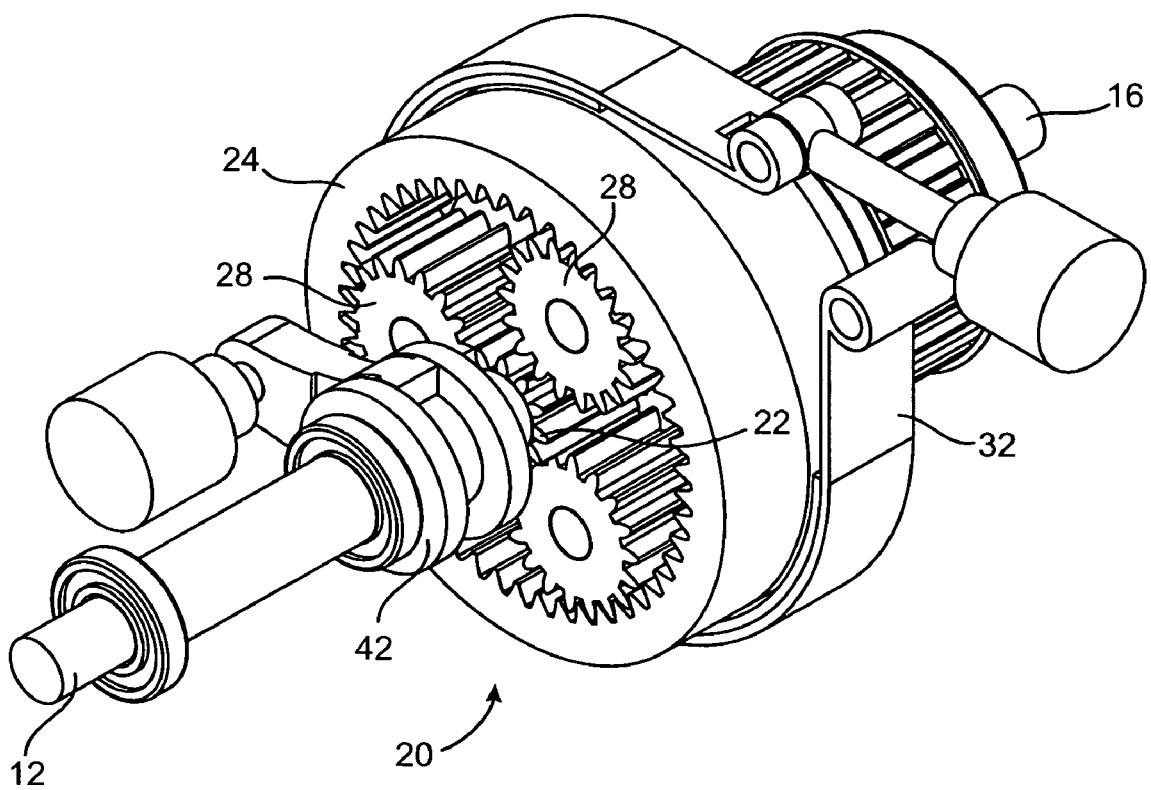
FIG. 4 is an isometric view of a continuously variable transmission of FIG. 2 for varying the transmission ratio between the first motor and the output shaft.
Figure 5:
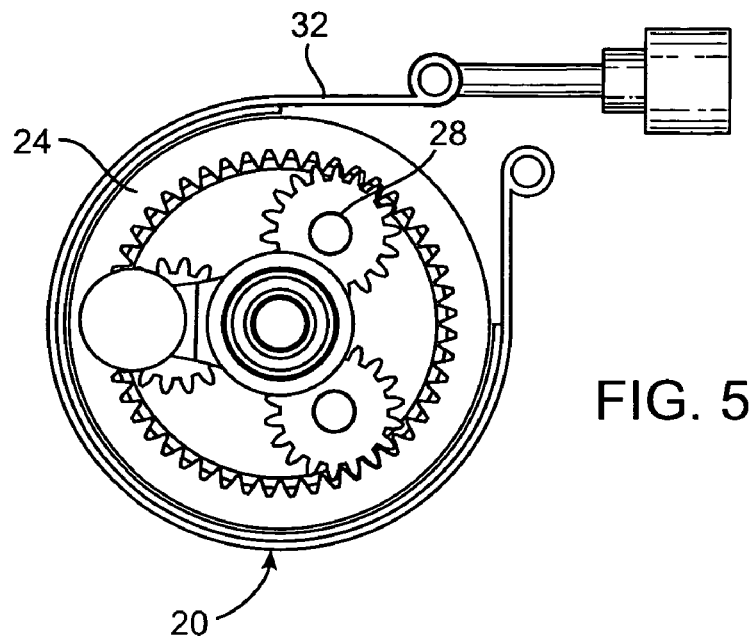
FIG. 5 shows an end view of the continuously variable transmission of FIG. 2.
Figure 6:
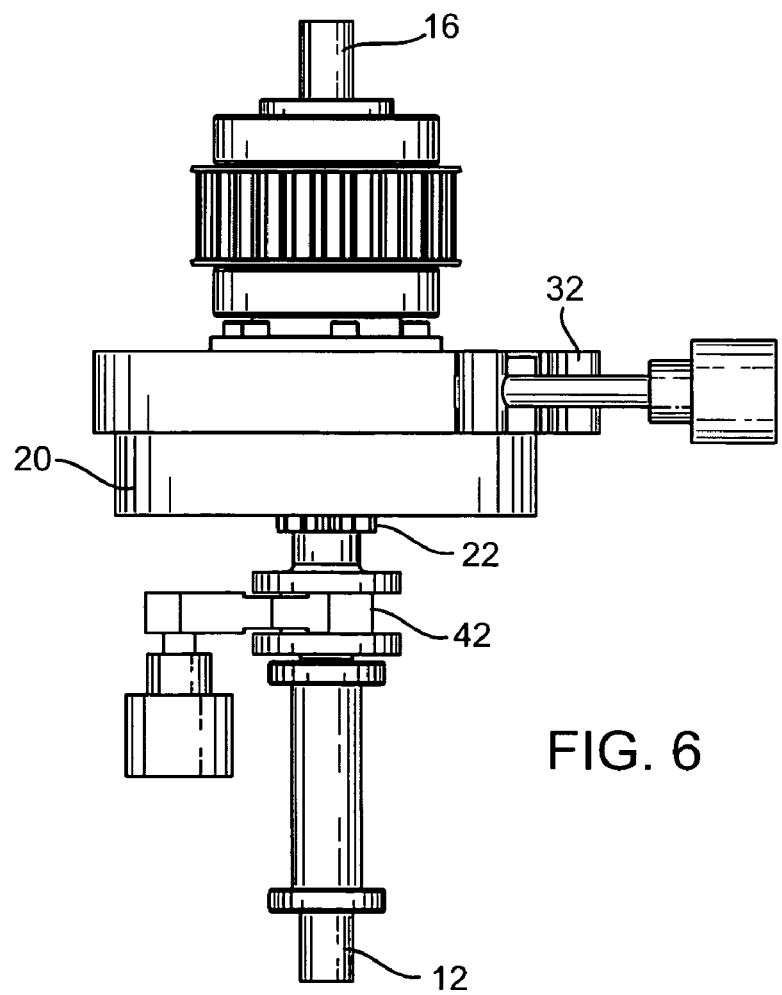
FIG. 6 is a side view of the continuously variable transmission of FIG. 2.
Figure 7:
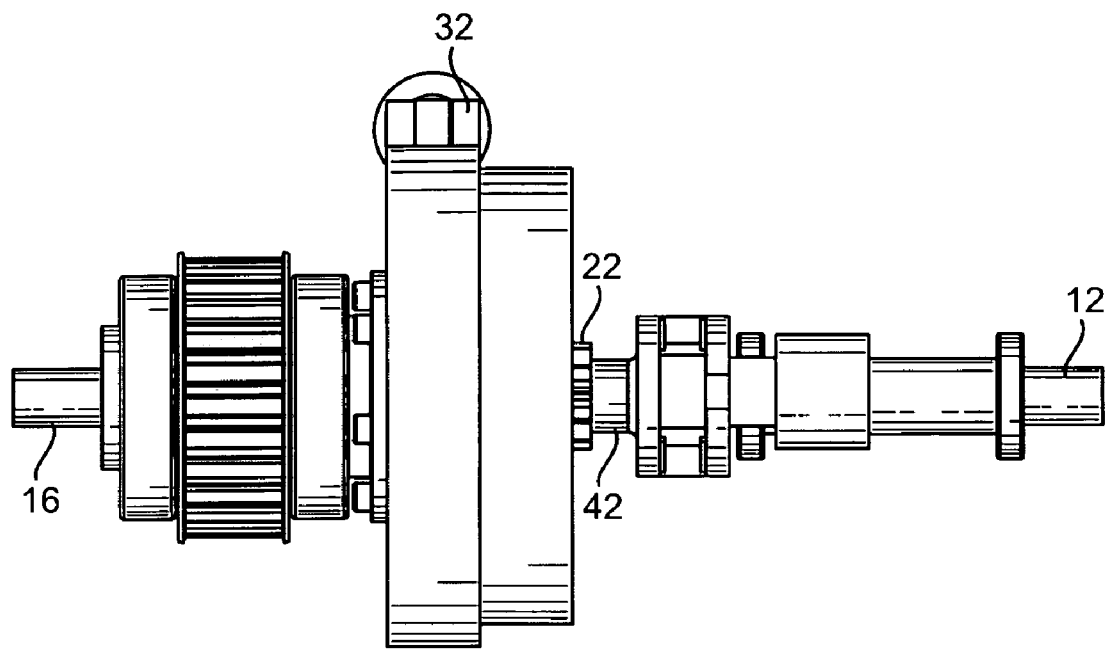
FIG. 7 is another side view of the transmission of FIG. 6
Figure 8:
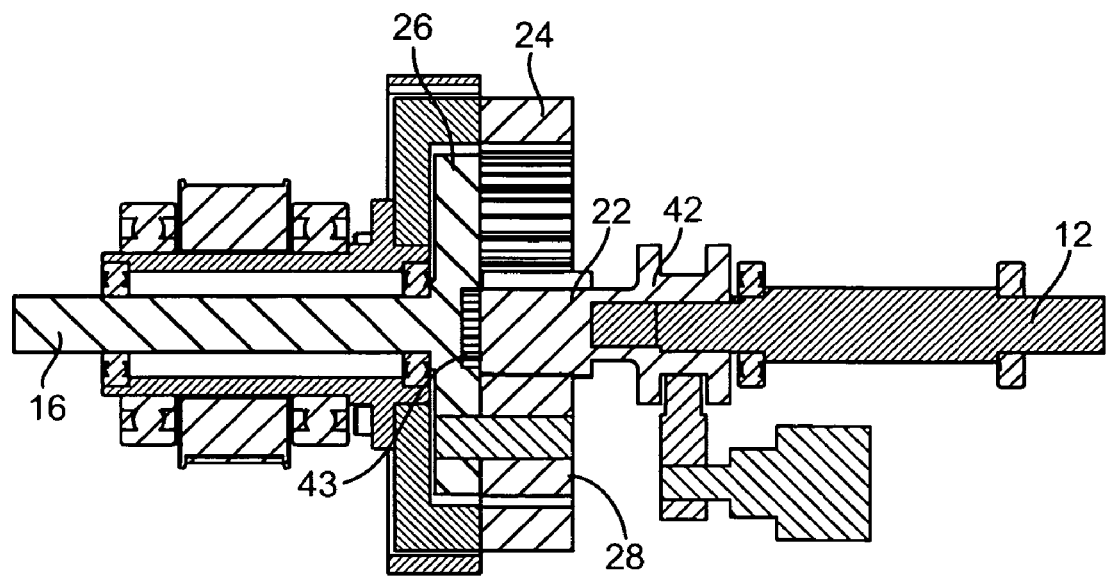
FIG. 8 is a cross-sectional view of the continuously variable transmission of FIG. 2.

Referring to FIG. 3, a schematic diagram of another drive system 4A is shown in which the same or similar reference numbers refer to the same or similar structure. The first motor 8 is coupled to a sun gear 22A, the second motor 10 is coupled to a carrier 26A having at least one planetary gear 28A, and the output shaft 16A coupled to a ring gear 24A. The drive system 4A provides many of the same advantages of the drive system 4 described above and the common aspects and advantages are equally applicable here. For example, the power of the first and second motors 8, 10 is combined while the second motor 10 changes the transmission ratio between the first motor 8 and the output shaft 16A. A brake assembly 32A may be used to stop rotation of the carrier 26A for the same purpose as the brake 32 used above for the ring gear 24. When the brake 32A is applied, the second motor 10 is locked out and all power comes from the first motor 8. A clutch/brake assembly 40A may stop rotation of the sun gear 22A and decouple the first motor 8 from the drive system 4A. The clutch/brake assembly 40A may be used to drive the system 4A with only the second motor 10. A synchronizer 42A is provided to couple the first motor 8 to the output 16A and second motor 10 for the purpose listed above.

Another common feature of the drive systems 4, 4A is that increasing the speed of the second motor 10 increases the speed of the output shaft 16A when the speed of the first motor 8 is held constant. This provides advantages over systems having a negative slope speed curve in which the transmission output shaft speed decreases when one motor increases in speed while the other remains constant. Of course, it can be appreciated that other configurations and gear sets may be used without departing from the scope of the present invention although the preferred embodiments described herein use a planetary gear set 20. The synchronizer 42, 42A also locks and couples the first and second motors 8, 10 to the output shaft 16, 16A as well. Of course, the second motor 10 may be isolated from the system using the brake assembly 32, 32A.

Various modes of operation are now described and it can be appreciated that other modes may be practiced while taking advantage of various aspects of the invention. The modes of operation are equally applicable to both drive systems 4, 4A and discussion of use with drive system 4 below is equally applicable to drive system 4A. The control system 18 is coupled to and controls the operation of the first and second motors 8, 10 as described below. The control system 18 is also coupled to external sensors 44 which monitor various parameters depending upon the particular use. One or both motors 8, 10 may have other components such as a transmission control and/or inverter/drive units 46. These other components may also be coupled to the external sensors 44 for use as is known in various applications of the present invention.

In one mode of operation, the control system adjusts the speed of the second motor 10 to adjust the transmission ratio (speed ratio) between the first motor 8 and the output shaft 16. The transmission ratio may be altered to maintain the first motor 8 within a desired operating range. One such range would be a speed range selected to optimize the performance of the first motor 8. For example, the second motor 10 may be used to adjust the transmission ratio of the first motor 8 so that the first motor 8 operates at or near peak efficiency and/or peak power output while the second motor 10 also adds power to the system. The specific peak power and/or efficiency operation ranges may depend on power requirements determined by external factors such as increasing loads or greater demand by the operator.

The ability to operate the first motor 8 within a desirable performance range provides certain specific advantages when the first motor 8 is an internal combustion engine and the second motor 10 is an electric motor. The efficiency of most internal combustion engines varies significantly over the normal range of operating speeds. The present invention provides the ability to operate the first motor 8 at or near peak efficiency and/or power for a given external load or operator input or demand while combining the power inputs from the first and second motors 8, 10.

The second motor 10 may be used to maintain the first motor 8 in a desired speed or efficiency range in any suitable manner. For example, for a given operator demand, the first motor 8 may vary less than 2000 rpm, less than 1000 rpm or even less than 500 rpm while the drive system 4 power output increases 50% and even 75% of the drive system's 4 peak power output. Stated another way, the second motor 10 is operated to control the transmission ratio between the first motor 8 and the output shaft 16 so that the first motor 8 operates at a speed which depends largely upon the speed of the second motor 10. Of course, the speed of the second motor 10 may be adjusted so that the first motor 8 operates at or near a target speed for any desired output shaft speed although even this method will likely lead to small speed variations resulting in a speed range.

While the transmission ratio between the first motor 8 and the output shaft 16 is varied continuously by the action of the second motor 10, the power output of the first motor 8 may also vary from partial to full power while the speed of the first motor 8 is maintained in a relatively tight range. Thus, it can be appreciated that the system of the present invention can continuously and efficiently transmit near peak power levels from the first motor 8 while the output shaft speed 16 increases from zero to the desired operating speed. If there is a change in the load conditions or operator demand the control system 18 may adjust the operation of the motors to efficiently meet the new requirements. For example, the required output torque on the transmission output shaft 16 may be used to determine the transmission ratio between the first motor 8 and the output shaft 16, wherein the transmission speed ratio is controlled by the speed of the second motor 10.

In another aspect, the second motor 10 not only continuously and steplessly adjusts the transmission ratio between the first motor 8 and the output shaft 16 but also adds power to the drive system 4 providing advantages over systems which vary the transmission ratio using a motor which does not add power to the drive system 4. The efficiency of a heat motor or engine, such as the internal combustion engine or turbine, often varies widely over its operating speed range. The present invention provides the ability to operate the heat engine, such as the internal combustion engine, at or near peak efficiency and/or power for a given set of output requirements so that the internal combustion engine operates within a narrow band of its performance curve. Thus, the first and second two motors 8, 10 produce and combine power at high levels of efficiency. The electric motor operates at relatively high efficiency throughout a broad speed range while the internal combustion engine operates at high efficiency and/or peak power within a relatively narrow speed range. As such, the electrical motor can be used to adjust the transmission ratio of the first motor 8 to the output shaft 16 so that the first motor 8 operates within a speed range for high efficiency and/or high power. The resulting drive system 4 is able to operate both motors at high efficiency and/or high power outputs while efficiently combining the power of both motors.

For example, when the first motor 8 is an internal combustion engine and the second motor 10 is an electric motor the internal combustion engine may be operated at or near a speed that can produce peak power even if the transmission output shaft 16 is not turning or is turning very slowly. Simultaneously, the power added by the second motor 10 is smoothly and efficiently added to the transmission output shaft 16 with the power from the first motor 8. This is the case when the present invention is being used to accelerate a high inertia load such as when a driver presses on the gas pedal of a vehicle from a standing start or when accelerating a high inertial load such as a crane boom.

The first and second motors 8, 10 may have the same or similar peak power ratings. In one embodiment, the first and second motors 8, 10 have a continuous or intermittent power rating and/or a peak power output which are within 20% of one another and more preferably within 10% of one another and most preferably within 5% of one another. Of course, even though the second motor 10 adds power to the system, in some configurations of the present invention the second motor 10 may have a much smaller continuous or intermittent peak power rating than the first motor 8. In either case, the second motor 10 would be used primarily to add power to the drive system 4 and continuously and steplessly vary the transmission ratio between the first motor 8 and the output shaft 16 thereby providing the efficiency benefits mentioned herein. The larger the second motor 10 is, up to the peak power of the first motor 8, the more power the second motor 10 is able to modulate from the first motor 8 through the transmission for some specific embodiments of the present invention.

The drive system 4 may also operate with only the first motor 8 driving the output shaft 16 when the control system 18 determines that operating conditions would benefit from isolating the second motor 10. This may be accomplished by applying the brake 32 to stop the ring gear 24 and stop and prevent rotation of the second motor 10. When the second motor 10 is an electric motor the brake stops the second motor 10 from rotating which prevents the second motor 10 from converting or absorbing energy. When the brake 32 engages the ring gear 24, only the first motor 8 drives the transmission output shaft 16 through a discrete speed ratio. When used in a hybrid vehicle, for example, the brake 32 may be applied to stop and mechanically isolate the second motor 10 when there are continuous low speed output shaft 16 requirements or high continuous external loads. In this manner, the present invention may be operated without using or storing energy in the power storage device 34. Alternatively, the first motor 8 may be locked to the output shaft 16 via the synchronizer 42. This also locks the second motor 10 to the output shaft 16 through a fixed speed ratio. In this mode of operation the second motor 10 may combine power serially to the drive system 4, may be used to generate electrical energy which is stored in the power storage device 34, or may convert no power in the system 4. This is particularly useful when large speed changes are not required on the output shaft 16 such as during cruising in a vehicle. Each of the modes of operation may be entered into or left as appropriate for the situation as determined by the control system, power requirements and user input.

Figure 9:
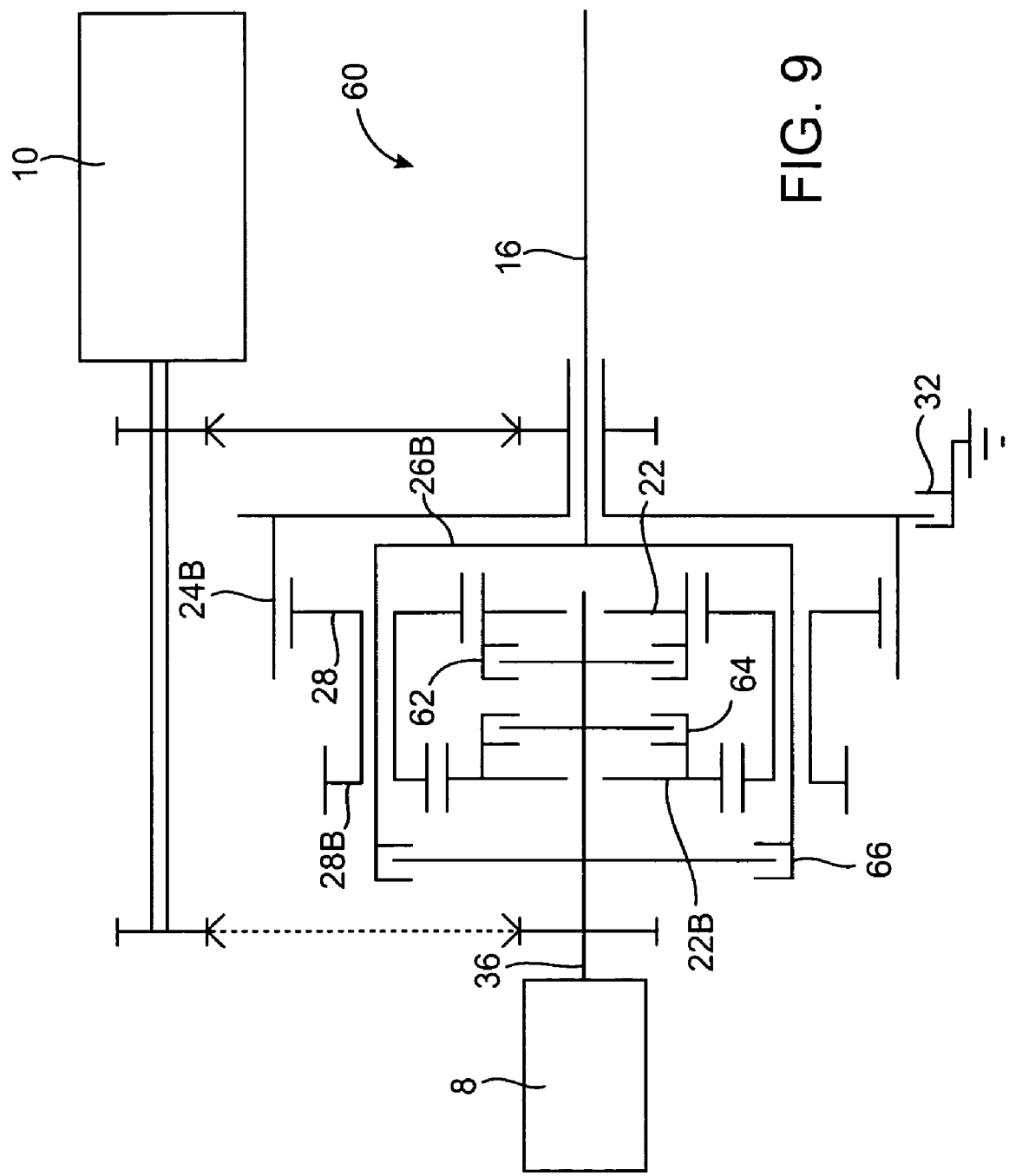
FIG. 9 shows another system in accordance with the present invention.

Referring now to FIG. 9, still another system 60 is shown schematically wherein the same or similar reference numbers refer to the same or similar structure. The system 60 is similar to the system 2 of FIGS. 1 and 2 and all aspects and features of the system 2 are incorporated here. The system 60 includes a first sun gear 22, a second sun gear 22B and a first clutch 62 and a second clutch 64 which are used to engage and disengage the sun gears 22, 22B from the power transmission path. The second motor 10 is coupled to a ring gear 24B which in turn engages a first planet gear 28. A brake 32 may be used to stop the ring gear 24B to provide a fixed gear ratio as described herein. A synchronizer 66 may be used to lock the first input shaft 36 to the output shaft 16 as also described herein. A carrier 26B is common to power transmission paths through either of the sun gears 22, 22B. The first planet gear 28 and a second planet gear 28B are mounted to the carrier 26B with each engaging one of the sun gears 22, 22B.

The system 60 may operate in substantially the same manner as the system of FIG. 2 when one of the clutches 62, 64 is engaged and the other is not so that the system 60 is being driven from the input shaft 36, through one of the sun gears 22, 22B then to the carrier 26B which is coupled to the output shaft 16. The system 60 may provide the advantages and features of the system 2 described above and those features and advantages are incorporated here. For example, the system 60 may be used to adjust the transmission ratio between the output shaft 16 and the first motor 8 by varying the speed of the second motor 10.

The addition of the second sun gear 22B provides an additional fixed gear ratio mode of operation as compared to the system 2 described above. The system 2 of FIG. 2 has two fixed gear modes. The first fixed gear mode is provided by locking the ring gear 24 for a low fixed gear ratio and the second fixed gear mode is provided by locking the sun gear 22 and the carrier 26 together. Both of these modes can be duplicated by the system 60 of FIG. 9. In both systems 2, 60 when ring gear 24, 24B is locked, it may also be advantageous to decouple the second motor 10 from ring gear 24B and couple it to the first input shaft 36. In this configuration the second motor 10 may add or convert power from the system as well as perform tasks such as starting the first motor when the first motor is a heat engine. This mode of operation can be applied to system 2 as well. Another fixed gear ratio is provided by locking the first input shaft 36 and the ring gear 24B together through a fixed speed ratio providing an additional fixed speed ratio for each sun gear 22, 22B. As shown in FIG. 9, it is advantageous in this mode to keep second motor 10 rotatably connected to the first input shaft 36 and the ring gear 24B so it can add or convert power in this mode as well. This mode of operation may be applied equally meaningfully to system 2, providing an additional fixed speed ratio to that system. Thus, the system 60 may be used as a five discrete speed transmission with no assistance from the second motor 10 if necessary. All five fixed gear modes result in the same output rotational direction, that is, none of the resulting output becomes "reversed" as can occur with some systems. This provides obvious advantages when operating equipment, such as a car, which operates primarily in one direction and requires a wider gear range in the driving direction. Similar to the systems described in connection with FIGS. 1-8, the second motor 10 may idle, assist in powering the output shaft 16 or generate energy for storage while the system 60 is operating in one of the fixed gear ratio modes.

The second sun gear 22B provides additional operating modes, other than the fixed gear ratio modes just described, over the system of FIG. 2. The second sun gear 22B may be used instead of the sun gear 22 to operate as described in connection with the system 2 but through a different sun gear 22B for a different gear ratio. For example, the power combining modes and/or modes for controlling the first motor 8 by altering the speed of the second motor may be operated with the second sun gear 22B rather than the first sun gear 22 to provide identical modes of operation with the benefit of a different gear ratio. The two different drive paths could be used for different parts of the first motor's performance such as one path being suitable for high efficiency and another being suitable for high power.

Figure 10:
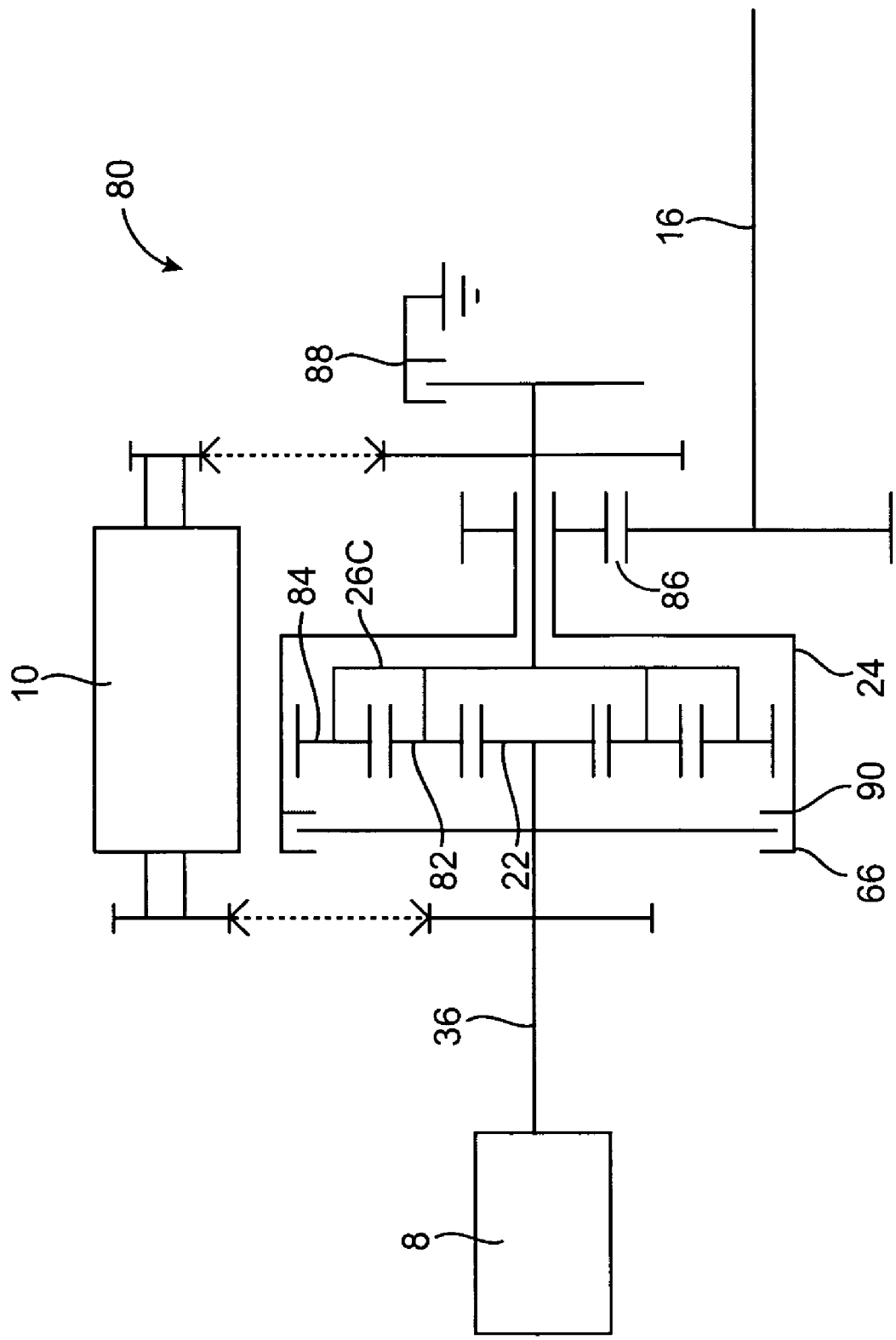
FIG. 10 shows still another system in accordance with the present invention.

Referring now to FIG. 10, still another system 80 is shown schematically wherein the same or similar reference numbers refer to the same or similar structure. The first motor 8 is coupled to a sun gear 22 which engages a first planet gear (or gears) 82 which in turn engages a second planet gear (or gears) 84. The first and second planet gears 82, 84 are coupled to a common carrier 26C which is coupled to the second motor 10. A ring gear 24 is coupled to the output shaft 16 via a coupling gear set 86.

The system 80 is similar to the systems described above and the description of the modes of operation and advantages are equally applicable here. For example, the transmission ratio or gear ratio between the first motor 8 and the output shaft 16 may be varied by changing the speed of the second motor 10. A first fixed gear ratio mode between the first motor and the output shaft 16 is provided by using a brake 88 to lock the carrier 26C. This mode results in a relatively low gear. As above, it is advantageous in this mode to decouple the second motor 10 from the locked carrier 26C and couple it to sun gear 22 so it can provide the functions described above. A second fixed gear ratio mode is provided by coupling the input shaft 36 (from the first motor 8) directly to the ring gear 24 using another gear or suitable coupling 90. This mode results in a relatively high gear. In either of the fixed gear ratio modes just described, the second motor 10 may idle, add power to the system, or generate energy for storage as needed. As conceptually described in the systems above, the carrier 26C may be selectively coupled to the first input shaft 36 and the second motor 10 through a fixed speed ratio to provide an additional fixed gear ratio. Thus, system 80 provides three discrete speed ratios that may be used with or without interaction from the second motor 10. Of course, system 80 may be used in the continuously variable transmission mode as well, as with all systems described herein.

Figure 11:
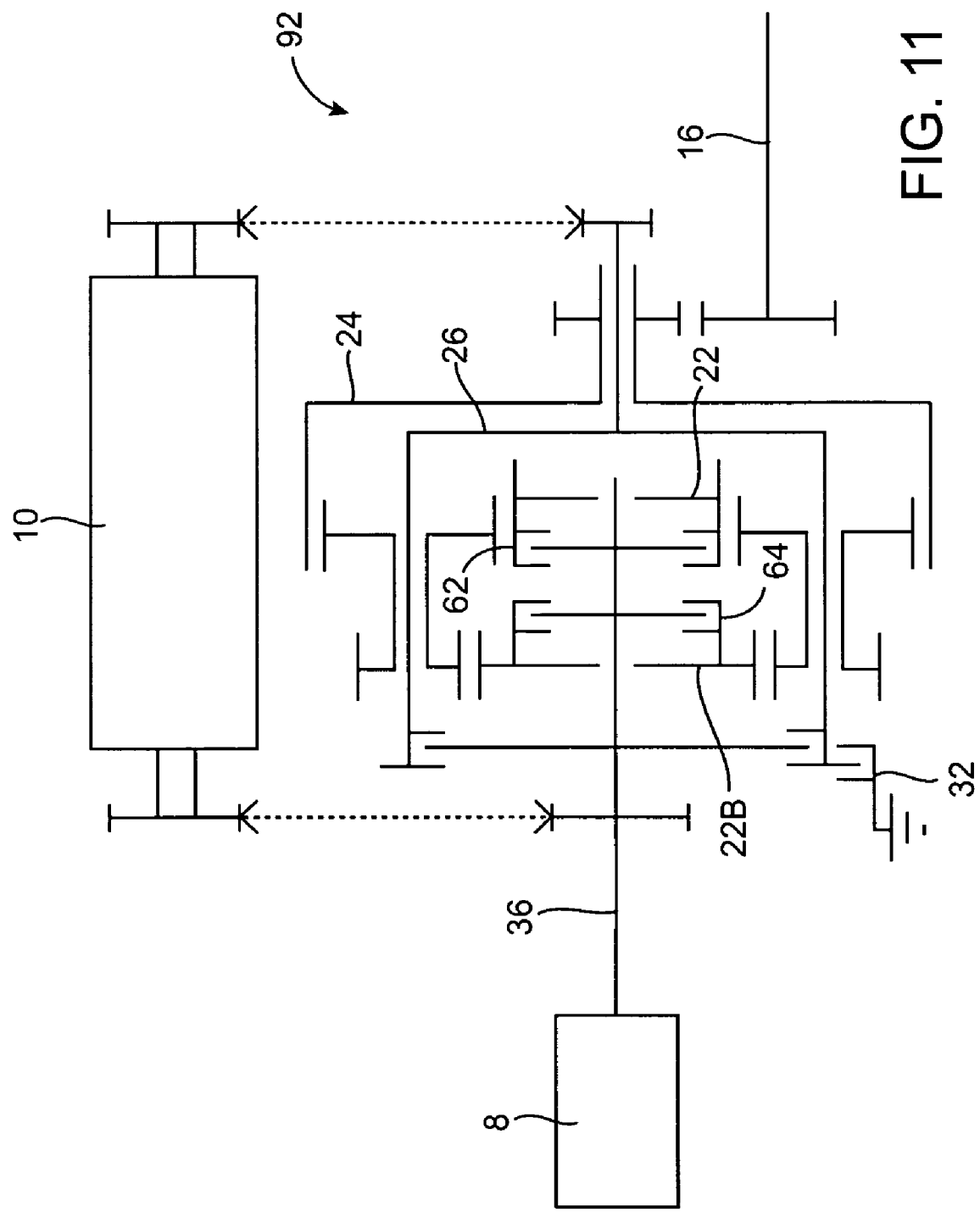
FIG. 11 shows yet another system in accordance with the present invention.

Still another system 92 is shown in FIG. 11 wherein the same or similar reference numbers refer to the same or similar structure. The system 92 is similar to the system 60 except that the second motor 10 and output shaft 16 switched connections between the ring gear 24 and carrier 26 so that the second motor is coupled to the carrier 26 and the output shaft 16 is coupled to the ring gear 24. The system 92 is similar to the systems of FIGS. 3 and 9 and all suitable uses, advantages and features of the systems of FIGS. 3 and 9 are incorporated here.

The system 92 is similar to the system of FIG. 3 in that the output 16 is coupled to the ring gear 24 and the second motor 10 is coupled to the carrier 26. As such, the system 92 may be operated in the same manner as FIG. 3 by simply disengaging the second sun gear 22B using the second clutch 64. Additional modes, but with a different gear ratio, may be operated by using a power transmission path through the second sun gear 22B rather than the first sun gear 22. The carrier 26 may also be locked to provide a fixed gear ratio mode. As with all the previous embodiments the second motor 10 may be selectively decoupled from its normal input position, with the carrier 26 in this case, and coupled to the first or second sun gears 22, 22B. This allows the second motor 10 to add or convert power in the system 92 while a fixed speed ratio mode is operational and the carrier 26 is locked. Furthermore, the carrier 26 may be selectively coupled to the first input shaft 36 and the second motor 10 through a fixed speed ratio to provide an additional fixed gear ratio for each sun gear 22, 22B. Thus, system 92 provides five discrete speed ratios that may be used with or without interaction from the second motor 10. This configuration allows similar operation in a continuously variable transmission mode as in previous embodiments but also may provide several fixed speed ratio modes that turn in the opposite direction from a first direction as with some other system configurations. Once again, the second motor 10 may idle, add power to the system or generate energy which is stored for later use in any mode of operation.

As can be appreciated from various aspects and advantages of the present invention, the present invention provides the drive system 4 with the ability to operate the first motor 8 at or near peak power while also adding peak or near peak power from the second motor 10. When using the drive system 4 in a hybrid vehicle, for example, the present invention can provide high performance over a broad range of operating conditions to satisfy the performance demands of many car owners. Thus, the present invention may help increase adoption of hybrid vehicles to consumers who would otherwise not consider a hybrid vehicle since these vehicles often do not meet their performance demands. Increased adoption of hybrid vehicles over conventional internal combustion engines would lead to decreased emissions which would enhance the quality of the environment. Increased adoption of hybrid vehicles would also contribute to the conservation of energy resources and, in particular, non-renewable resources such as fossil fuels.

The present invention has been described in connection with the preferred embodiments, however, it can be appreciated that other suitable embodiments can be designed without departing from the scope of the invention. Furthermore, it is understood that all elements and features described for one of the preferred embodiments is equally applicable to the other embodiment or other systems within the scope of the present invention.

What is claimed is:

1. A drive system for performing work, the drive system comprising:
    a planetary gear set including a first sun gear, a second sun gear, a ring gear and a carrier having a first planet gear;
    a first motor,
    a second motor coupled to the ring gear; and
    an output shaft coupled to the carrier, the first motor being drivingly coupled to the output shaft through either the first sun gear or the second sun gear;
    means for locking the ring gear to provide a fixed gear ratio between the first motor and the output shaft;
    wherein the speed of the second motor is changed to change a transmission ratio between the first motor and the output shaft when the locking means is not locking the ring gear.

2. The drive system of claim 1, wherein:
    the first and second motors combine power.

3. The drive system of claim 1, wherein:
    the first motor is a heat engine; and
    the second motor is an electric motor.

4. The drive system of claim 1, wherein:
    a speed of the second motor is used to vary a transmission ratio between the first motor and the output shaft in response to a torque demand on the output shaft.

5. The drive system of claim 4, further comprising:
    a control system which controls operation of the first and second motors, the control system varying the speed of the second motor to vary the transmission ratio in response to a torque on the output shaft.

6. The drive system of claim 5, wherein:
the control system varies the speed of the second motor to vary the transmission ratio to maintain the first motor in a desired operating range.

7. The drive system of claim 6, wherein:
the control system varies the speed of the second motor so that the first motor operates in a desired speed range.

8. The drive system of claim 7, wherein:
the control system varies the speed of the second motor so that the first motor operates within a range of 2000 rpm while the power increases at least 50% of a peak power output.

9. The drive system of claim 1, wherein:
the first and second motors are coupled together so that changing a speed of the second motor changes a transmission ratio of the first motor relative to the output shaft.

10. The drive system of claim 1, further comprising:
a second planet gear;
wherein the first planet gear engages the first sun gear and the second planet gear, the second planet gear engaging the ring gear.

11. The drive system of claim 10, wherein:
the first motor may be coupled to the ring gear to provide a fixed gear ratio between the first motor and the output shaft.

12. The drive system of claim 1, wherein:
the second motor is coupled to the first motor to provide a fixed gear ratio between the first and second motors, the second motor also being coupled to the ring gear.

13. A drive system for performing work, the drive system comprising:
a planetary gear set including a first sun gear, a second sun gear, a ring gear and a carrier having a first planet gear;
a first motor;
a second motor coupled to the ring gear; and
an output shaft coupled to the carrier;
means for locking the ring gear to provide a fixed gear ratio between the first motor and the output shaft;
wherein the speed of the second motor is changed to change a transmission ratio between the first motor and the output shaft when the locking means is not locking the ring gear;
wherein the output shaft may be drivingly coupled to either the first sun gear or the second sun gear to provide two different fixed gear ratios.

14. A drive system for performing work, the drive system comprising:
a planetary gear set including a sun gear, a ring gear and a carrier having a first planet gear;
a first motor coupled to the sun gear;
a second motor coupled to the ring gear; and
an output shaft coupled to the carrier;
means for locking the ring gear to provide a fixed gear ratio between the first motor and the output shaft; and
a coupling mechanism, the coupling mechanism being configured to selectively couple and decouple the second motor from the first motor when the ring gear is locked with the locking means;
wherein the speed of the second motor is changed to change a transmission ratio between the first motor and the output shaft when the locking means is not locking the ring gear.

15. A drive system for performing work, the drive system comprising:
a planetary gear set including a first sun gear, a second sun gear, a ring gear and a carrier having a first planet gear;
a first motor,
a second motor is coupled to the carrier; and
an output shaft is coupled to the ring gear, wherein the first motor may be drivingly coupled to the output shaft through either the first sun gear or the second sun gear;
a brake to stop rotation of the carrier to provide a fixed gear ratio mode between the first motor and the output shaft;
wherein the speed of the second motor is changed to change a transmission ratio between the first motor and the output shaft when the brake is not stopping rotation of the carrier.

16. The drive system of claim 15, wherein:
the first and second motors combine power.

17. The drive system of claim 15, wherein:
the first motor is a heat engine; and
the second motor is an electric motor.

18. The drive system of claim 15, wherein:
a speed of the second motor is used to vary a transmission ratio between the first motor and the output shaft in response to a torque demand on the output shaft.

19. The drive system of claim 18, further comprising:
a control system which controls operation of the first and second motors, the control system varying the speed of the second motor to vary the transmission ratio in response to the torque on the output shaft.

20. The drive system of claim 19, wherein:
the control system varies the speed of the second motor to vary the transmission ratio to maintain the first motor in a desired operating range.

21. The drive system of claim 19, wherein:
the control system varies the speed of the second motor so that the first motor operates in a desired speed range.

22. The drive system of claim 19, wherein:
the control system varies the speed of the second motor so that the first motor operates within a range of 2000 rpm while the power increases at least 50% of a peak power output.

23. The drive system of claim 15, wherein:
the first and second motors are coupled together so that changing a speed of the second motor changes a transmission ratio of the first motor relative to the output shaft.

24. The drive system of claim 23, further comprising:
a second planet gear;
wherein the first planet gear engages the first sun gear and the second planet gear, the second planet gear engaging the ring gear.

25. The drive system of claim 23, wherein:
the first motor may be coupled to the ring gear to provide a fixed gear ratio between the first motor and the output shaft.

26. The drive system of claim 23 wherein:
the second motor is configured to be coupled to the first motor to provide a fixed gear ratio between the first and second motors.

27. A drive system for performing work, the drive system comprising:
a planetary gear set including a first sun gear, a second sun gear, a ring gear and a carrier having a first planet wear;
a first motor,
a second motor is coupled to the carrier;
an output shaft is coupled to the ring gear; and a brake to stop rotation of the carrier to provide a fixed gear ratio mode between the first motor and the output shaft;

wherein the speed of the second motor is changed to change a transmission ratio between the first motor and the output shaft when the brake is not stopping rotation of the carrier;

wherein the output shaft may be drivingly coupled to the first motor through either the first sun gear or the second sun gear to provide two different fixed gear ratios.

28. A drive system for performing work, the drive system comprising:

a planetary gear set including a first sun gear, a second sun gear, a ring gear and a carrier having a first planet gear;

a first motor, a second motor is coupled to the carrier; and an output shaft is coupled to the ring gear, wherein the first motor may be drivingly coupled to the output shaft through either the first sun gear or the second sun gear;

a brake to stop rotation of the carrier to provide a fixed gear ratio mode between the first motor and the output shaft;

a coupling mechanism configured to selectively couple and decouple the second motor from the first motor when the carrier is locked with the brake;

wherein the speed of the second motor is changed to change a transmission ratio between the first motor and the output shaft when the brake is not stopping rotation of the carrier;

the first and second motors being coupled together so that changing a speed of the second motor changes a transmission ratio of the first motor relative to the output shaft.

* * * * *